United States Patent Office 2,992,077
Patented July 11, 1961

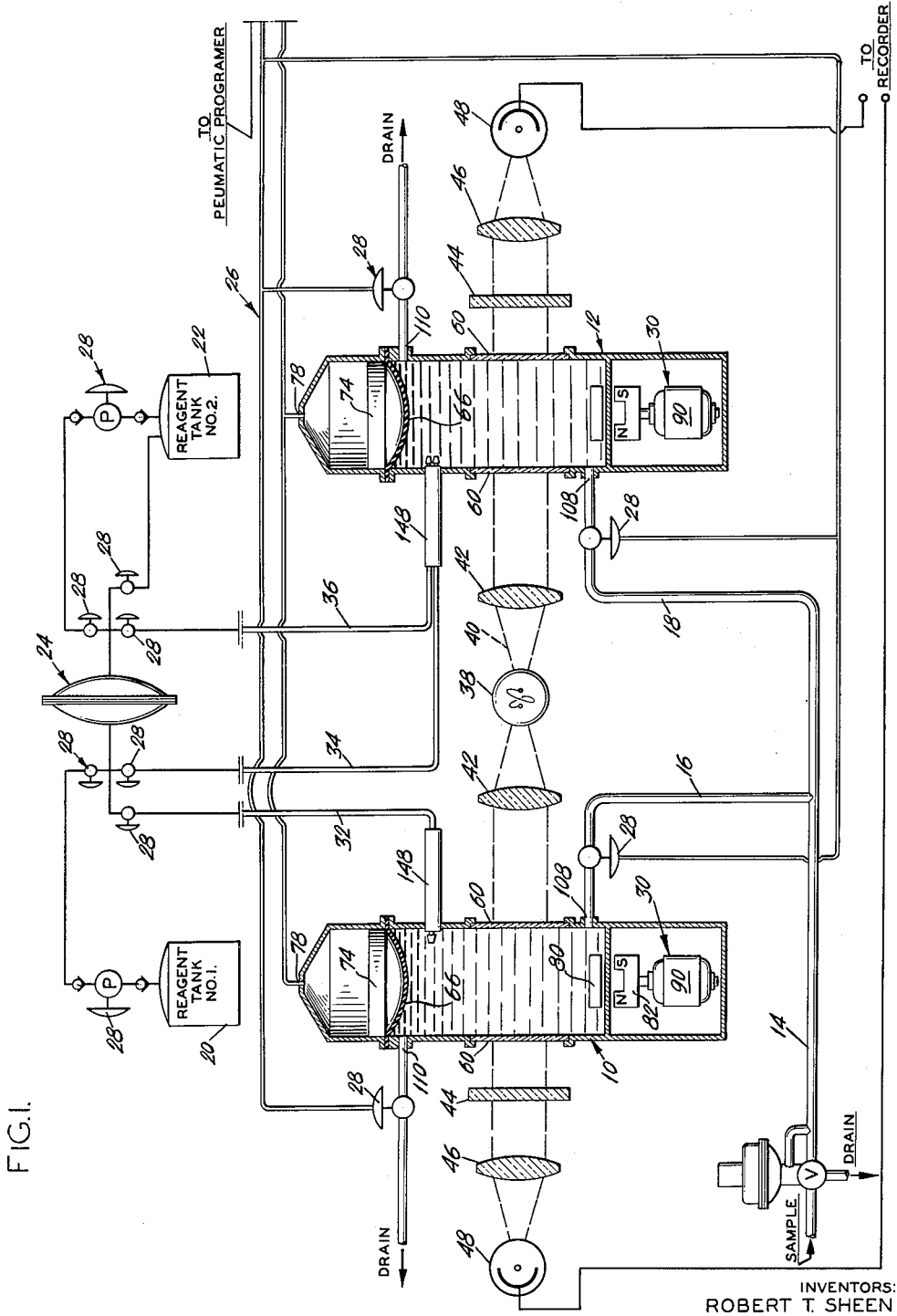

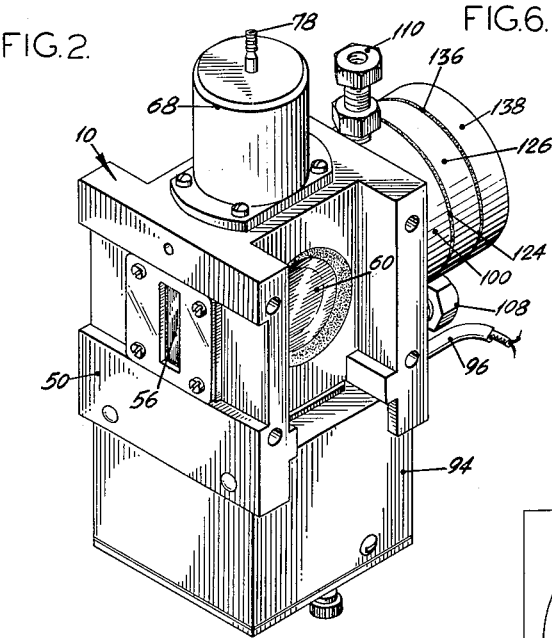
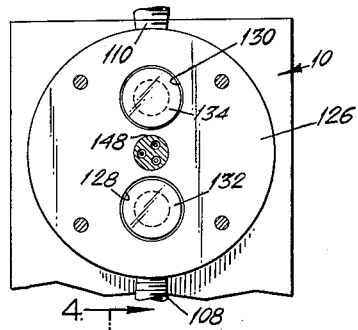
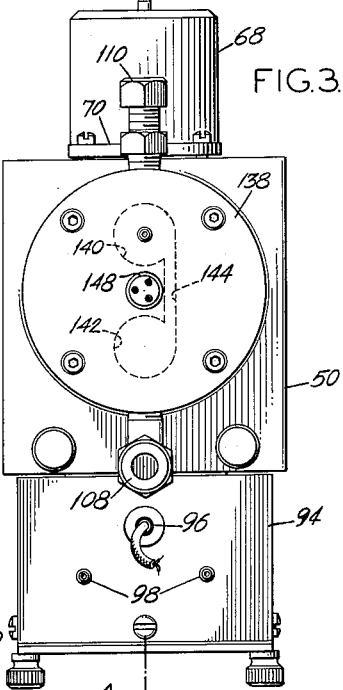
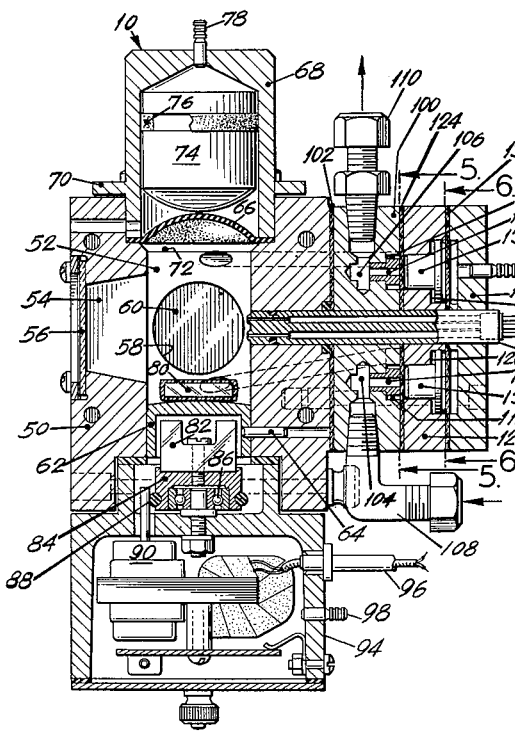

2,992,077
EXPANSIBLE VOLUME ANALYZER SAMPLE
CELL FOR COLORIMETRIC ANALYZERS
George W. Schneider, Jr., St. Petersburg, Fla., and Robert T. Sheen, Fort Washington, Pa., assignors to Milton Roy Company, Philadelphia, Pa., a corporation of Pennsylvania
Filed Sept. 15, 1958, Ser. No. 760,954
5 Claims. (Cl. 23—253)

The present invention relates broadly to colorimetric type chemical analyzers, and more particularly to an expansible volume sample cell for use in a colorimetric chemical analyzer.

It is an object of the present invention to provide a construction for a sample cell which is completely enclosed, and provided with a flexible diaphragm at a top opening to prevent the possibility of contamination of sample fluids therein by atmospheric air.

Another object of the present invention is to provide a sample cell construction which makes it possible to analyze water for dissolved oxygen without introducing any error from contamination by oxygen in the atmosphere, as would be the case if conventional open known types of sample cells were employed.

A further object of the present invention is to provide a completely enclosed sample cell of the nature described in which the sample cell is always filled with fluid, whereby air bubbles are not injected into the fluid and the sample being always free of such bubbles eliminates a cause of considerable error in some known photo-electric measuring systems.

Another object of the present invention is to provide a completely enclosed colorimetric analyzer sample cell which is covered by a flexible diaphragm to permit expansion of the fluid contents by the addition of liquid reagents, and which excludes any possibility of contamination of the fluid by atmospheric gases and interference caused by bubbles.

A still further object of this invention is to provide a sample cell for use in colorimetric analyzer systems wherein the volume of the sample cell can be fixed so that an exact and repeatable quantity of sample fluid will always be contained therein.

Another object of the present invention is to provide a sample cell construction wherein complete scavenging of reagents and reacted samples is obtained.

An additional object of the present invention is to provide a sample cell of such construction that an exact and repeatable quantity of sample fluid will always be contained therein without the necessity of using any auxiliary sample measuring pumps as heretofore employed in some known types of analyzers.

A still further object of the present invention is to provide an expansible volume completely enclosed sample cell adapted for use in colorimetric analyzer systems of a type shown in copending applications Serial No. 7,338,-524, entitled Chemical Blank Colorimetric Analyzer, filed May 28, 1958, and more particularly in a copending application in the name of George W. Schneider, Jr., entitled Pneumatic Programming System for Colorimetric Analyzers, assigned to a common assignee with the present application, executed on even date herewith, Serial No. 760,953, filed September 15, 1958, to which reference may be made for the over-all pneumatic system and operation thereof.

Additional objects, features and advantages of the present invention will be more readily apparent from the following detailed description of an illustrative example of an embodiment thereof when taken together with the accompanying drawings in which:

FIG. 1 is a fragmentary schematic diagram of a colorimetric type chemical analyzer having a pneumatic programming system, and incorporating the expansible volume sealed sample cells of the present invention;

FIG. 2 is a perspective view of the sample cell of the invention;

FIG. 3 is a side elevational view of the sample cell;
FIG. 4 is a sectional view taken on line 4—4 of FIG. 3;
FIG. 5 is a view taken on line 5—5 of FIG. 4; and
FIG. 6 is a view taken on line 6—6 of FIG. 4.

Referring now in detail to the drawings, FIG. 1 schematically shows a fragment or portion of a colorimetric type chemical analyzer system which is pneumatically controlled and programmed, and which is intended for measuring dissolved oxygen in boiler water. This analyzer system utilizes a double beam colorimeter including a sample measuring cell 10 and a comparison cell 12 in spaced relationship with respect to one another. These sample cells are adapted for holding equal volumes of the sample fluid to be tested into which reagents are subsequently introduced to react with the material being tested for and result in a coloring of the fluid in such manner that the amount of the material in the sample fluid can be quantitatively determined. The sample fluid is introduced through conduit 14 connected to the source equally through branch conduits 16 and 18 into the interiors of the sample cell 10 and comparison cell 12, under a desired amount of line pressure such for example, as 20 pounds per square inch.

Reagents of the desired type are introduced into the two cells from reagent tanks 20 and 22 through a minus delta P reagent metering device broadly designated 24. The reagents are metered into the cells in accordance with a pneumatic programmer system, not shown in detail herein, in accordance with the teachings of said copending application of George W. Schneider, Jr., executed on even date herewith. The control from the pneumatic programmer is effected through a plurality of pneumatic control tubes such as 26 in which pressure is selectively and sequentially reduced to atmospheric pressure upon bleeding from a given tube. A plurality of diaphragm valves such as at 28, selectively control the flow of fluid through the various conduits leading into the test cells.

In the schematic system shown in FIG. 1 it will be noted that reagent from tank number 20 is introduced into both sample and comparison cells 10 and 12, whereas reagent from tank number 22 is introduced solely into comparison cell 12. Magnetic stirring devices broadly designated 30 are provided for agitating liquids in the cells 10 and 12. Reagent from tank 20 is introduced into cell 10 through conduit 32. The reagent from tank 20 is introduced into cell 12 through conduit 34. Reagent from tank 22 is introduced into cell 12 through conduit 36. It will be noted that both inlet conduits and outlet drains for the two cells are operated by means of diaphragm valves which are controlled through tubes 26 by the pneumatic programmer.

In the usual manner, in colorimetric analyzers of the type described, a source of light 38 is interposed between the cells and the light beams 40 emanating therefrom pass through lens 42 thence through transparent windows in opposite sides of the cells, through filters 44, condensing lenses 46 and on to photoelectric cells 48. The photoelectric cells, in conjunction with additional circuitry, translate the so impinged light beams into electrical energy which then serves to give a quantitative indication or measure of the amount of material being tested for in the sample fluid.

The foregoing described system and components thereof are only broadly dealt with herein since they do not form a part of the present invention as such. The description is necessary, however, in order to provide a proper setting for explanation of the sample cell construction of the present invention.

Referring now to FIGS. 2–6 inclusive there is shown a sample cell in accordance with the present invention.

Each of the cells 10 and 12 are of identical construction, and consist in a cell body 50 having a vertically disposed cylindrical opening 52 therein which serves as the sample containing compartment. A tapered slot 54 extends from the opening 52 through a side of body 50 and is covered by an inspection window 56. At right angles to the slot 54, circular openings 58 are provided at diametrically opposite sides of the opening 52 extending to the exterior of the body and are covered by suitably sealed and gasketed windows 60. These openings or windows are transparent and adapted for passage of the light beams 40 through the cells as indicated in FIG. 1. A hollowed out cylindrical cell bottom 62 closes the bottom of the opening 52, and is secured in position by pin 64 following adjustment of its position to give the desired cell volume or capacity. The open top of the cell is closed by means of a flexible rubber diaphragm 66 secured in place by the lower end of expansion chamber cylinder 68, which seats on top of the cell body 50 by means of flanges 70. It will be noted that the upper end of opening 52 is beveled or tapered as at 72 for purposes hereinafter to be set forth.

A cylindrical expansion piston 74 having a lower convex end is slidably mounted in the interior of expansion chamber cylinder 68 and is provided with a gasket as at 76. An air inlet nozzle 78 opens into the top of the interior of the expansion chamber cylinder. In the position shown in FIG. 4 of the drawing, the expansion piston 74 is in its uppermost position and no air pressure is being exerted thereon through one of the connecting pneumatic control tubes 26. Additionally, in this figure the flexible diaphragm 66 is in the raised position it assumes following the introduction of reagents into the cell in addition to the sample fluid contained therein. When pressure is introduced above the piston, it is depressed driving with it the diaphragm until the piston seats on the beveled portion 72, and in this position the diaphragm and piston act to give a predetermined volumetric capacity to the cell in an obvious manner.

Means are provided for stirring or agitating the liquid or fluid within the cell. This includes a plastic covered bar magnet 80 freely rotatably supported on the cell bottom. A permanent magnet 82 is partially inserted in the opening in the cell bottom and is secured on a magnetic turn table 84 which is rotatably journaled on bearing 86. A rubber tire 88 is mounted on turn table 84. A unidirectional motor 90 is secured on motor bracket 92 within agitator housing 94. The shaft of motor 90 engages with the outer periphery of rubber tire 88 and upon actuation of the motor serves to revolve or rotate the permanent magnet 82. This is magnetically coupled with the plastic covered magnetic bar which causes its rotation within the enclosed cell interior. An electrical lead in connection for the motor is indicated at 96. Extending through the wall of the agitator housing 94 are air nozzles such as at 98 to permit circulation of cooling air in the housing when the motor is being operated.

A valve block 100 is secured to a side of the cell body 50 by any desired means, with the interposition therebetween of a gasket 102 in the nature of a diaphragm. This diaphragm is preferably rubber material. This valve block has inlet and outlet bores therein 104 and 106 respectively, into which are connected inlet and outlet fittings 108, 110 respectively for the introduction into, and discharge of sample fluid from, the interior of the cell. The inlet and outlet bores 104 are connected with annular inlet and outlet chambers 112, 114 respectively in which are operatively inserted inlet and outlet valve bodies 116, 118 respectively, having orifices therethrough and the ends being spaced from the walls of the annular chambers 112, 114.

Two passageways 120a and 120b are formed in valve block 100 and continued in cell body 50 and interconnect inlet chamber 112 and the interior of the cylindrical opening 52, in proximity to the bottom of the cell, at spaced points. These passageways open tangentially into the cell and upon actuation of the device permit sample fluid to flow in through inlet fitting 108. The fluid will therefore pass into the interior of the cell, and due to the tangential arrangement will cause a swirling of the fluid therein. A passageway 122 is formed in valve block 100 and continued in cell body 50, interconnecting outlet chamber 114 and the interior of the cylindrical opening 52, or interior of the cell, in proximity to the top opening thereof just below the diaphragm 66.

At the same time that fluid is introduced into the cell, it will, due to pressure, flow outwardly through this passageway 122 for discharge through outlet fitting 110. Normally the bores through the valve bodies 116 and 118 are closed by means of a rubber diaphragm 124 which prevents any fluid from flowing through the valve bodies into the chambers and into the passageways. This diaphragm 124 is secured in place by means of a cell valve body 126 having annular openings 128 and 130 therein, aligned with the inlet and outlet chambers 112 and 114. Valve pistons 132 and 134 are slidably inserted in these openings 128 and 130 respectively. The cell valve body is covered by a rubber diaphragm 136 which also covers the rear of the valve pistons and the rubber diaphragm is maintained in place by a cell valve cap 138 provided with recesses 140 and 142 aligned with the openings 128 and 130 in the cell valve body 126. The recesses 140 and 142 are interconnected by channel 144.

An air inlet nozzle 146 opens into recess 140. In operation, during the cycle when air under pressure passes through nozzle 146, the diaphragm 136 is pressed against valve pistons 132 and 134 which in turn close the openings in inlet and outlet valve bodies 116 and 118 to prevent fluid flow through the cell. When the air pressure is relieved then fluid flow can take place since the diaphragm 124 no longer closes the openings in the valve seats, and pressure of liquid passing in through inlet fitting 108 will force the diaphragm away from the openings therein.

An injection reagent nozzle 148 for introduction of the reagents from either of the tanks is inserted in a bore passing into the interior of the cell, as shown in FIG. 4, having one or more passageways therethrough for interconnection with one or more of the reagent conduits 32, 34 or 36 as shown in FIG. 1 of the drawings. The number of passageways through the injector nozzzle depends upon the type of analysis being conducted, and the number of reagents which must be placed in the sample and/or comparison cells.

It will be seen that with this construction, a completely enclosed sample cell is provided with a flexible diaphragm at the top opening so that there is no possible contamination of the sample fluid by atmospheric air. The use of the flexible diaphragm permits expansion of the fluid contents by the addition of liquid reagents after a predetermined volume of fluid has been introduced into the interior of the cell. The volume of the sample cell is fixed so that an exact and repeatable quantity of sample fluid will always be contained therein. This is accomplished by means of the volume expansion piston, in conjunction with the other construction, which actuates the flexible volume expansion diaphragm. With the piston and diaphragm depressed, the sample cell is flushed and at the same time replenished with new sample fluid since the inlet valve is open and the outlet drain valve is discharging fluids from the sample cell. At the same time, since air pressure is being applied against the top side of the volume expansion piston so that it is held tightly downwards in the position contacting the bevel 72, and the volume expansion diaphragm is stretched downward in a concave position, the volume of the sample cell is an exact and fixed volume. Because of this method of operation, complete scavenging of reagent and reacted samples is obtained and an exact quantity of new sample is always metered into the sample cell. The sampling cycle is completed after sufficient time has been allowed for the sampe cell to be completely flushed and replenished with a new sample, at which time, both the inlet and outlet valves are closed and the trapped quantity of sample fluid thereby remains in the sample measuring cell.

Due to the construction of this cell, the fluid volume therein can be expanded to permit the addition of the various reagents required to perform the colorimetric analysis. This function is performed after completion of the sampling period by the closing of the sample inlet and drain valves. The air pressure on top of the volume expansion piston is reduced to atmospheric pressure so that upon injection of the reagent into the sample fluid, the volume expansion diaphragm is free to float upwards to allow for the additional volume of the injected reagents. This condition is illustrated in FIG. 4 of the drawings by the convexed upward position of the diaphragm at which position the volume expansion piston would be in the maximum upward position against the top head of the sample measuring chamber.

Operation of the present invention will be readily apparent from the foregoing description. Manifestly minor changes in details of construction can be effected without departing from the spirit and scope of the invention as defined in, and limited solely by the appended claims.

We claim:

1. A sample cell for analyzing fluids for chemical constituents thereof comprising a cell body, a completely enclosed self-contained fluid measuring chamber in said body, a flexible diaphragm constituting a closure for an end of said chamber, sample fluid inlet means opening into said chamber, fluid reagent inlet means opening into said chamber, fluid outlet means opening into said chamber, and means for flexing said diaphragm convexly into the interior of said chamber and concavely out of said chamber for establishing a predetermined volumetric capacity in said chamber for a predetermined volume of sample fluid initially to be introduced into said chamber and upon retraction of said diaphragm establishing a different volumetric capacity permitting addition of a predetermined volume of reagent into the sample fluid in said chamber.

2. A sample cell as claimed in claim 1, said chamber being cylindrical, a cylindrical expansion chamber formed as a continuation of said cylindrical fluid measuring chamber above said diaphragm, an expansion piston slidably mounted in said expansion chamber and having a concave lower face contacting said diaphragm, and means for selectively introducing air under pressure into said cylinder above said piston for displacing said piston downward and depressing said diaphragm convexly into said measuring chamber to define said predetermined capacity for sample fluid in said chamber, and subsequently releasing air pressure to permit retraction of said piston and diaphragm upon introduction of said reagent to the concave position of the diaphragm to permit addition of said predetermined volume of reagent.

3. A sample cell as claimed in claim 1, a valve block having spaced inlet and outlet annular chambers therein, inlet and outlet passage ways interconnecting said chambers and the interior of said fluid measuring chamber, valve bodies in said annular chambers having openings therethrough connecting at one end with fluid inlet and outlet openings to the exterior, a flexible diaphragm covering said chambers and said openings therethrough and means for applying pressure to said diaphragm to close said chambers and said openings in said valve bodies to prevent passage of fluid therethrough.

4. A sample cell as claimed in claim 3, two passageways interconnecting said inlet annular chamber and the interior of said fluid measuring chamber opening tangentially into the bottom of said fluid measuring chamber and adapted for circulating fluid therein.

5. A sample cell as claimed in claim 4, a cell valve body having openings therein secured against said diaphragm over said valve bodies, valve pistons slidably mounted in said openings, a diaphragm over and in contact with the outer ends of said valve pistons, a cell valve cap having interconnected openings therein secured to said valve body over said last named diaphragm and means for introducing air under pressure into said interconnected openings for moving said valve pistons through said last named diaphragm against said diaphragm closing said valve body openings for closing said valves.

References Cited in the file of this patent

UNITED STATES PATENTS

| | | |
|---|---|---|
| 2,711,134 | Hughes | June 21, 1955 |
| 2,736,332 | Simmons | Feb. 28, 1956 |
| 2,837,007 | Crawford | June 3, 1958 |
| 2,859,020 | Eddy | Nov. 4, 1958 |
| 2,902,936 | Bradley | Sept. 8, 1959 |
| 2,915,016 | Weaver | Dec. 1, 1959 |
| 2,920,573 | Schaurte | Jan. 12, 1960 |
| 2,927,431 | Pitts | Mar. 8, 1960 |

OTHER REFERENCES

Wall: Ind. Eng. Chem., vol. 50, July 1958, pp. 65A and 66A.